United States Patent [19]

Crall et al.

[11] Patent Number: 5,562,419
[45] Date of Patent: Oct. 8, 1996

[54] SHROUDED FAN BLISK

[75] Inventors: David W. Crall, Loveland; Richard C. Haubert, Hamilton, both of Ohio

[73] Assignee: General Electric Company, Cincinnati, Ohio

[21] Appl. No.: 471,292

[22] Filed: Jun. 6, 1995

[51] Int. Cl.⁶ .................................................. F01D 5/22
[52] U.S. Cl. ...................... 416/190; 416/193 R
[58] Field of Search .................................. 416/190, 191, 416/193 R; 415/77, 83, 84

[56] References Cited

U.S. PATENT DOCUMENTS

| | | | |
|---|---|---|---|
| 1,301,705 | 4/1919 | Junggren | 416/190 |
| 3,112,865 | 12/1963 | Gisslen | 416/193 R |
| 3,451,654 | 6/1969 | Johnson | 416/190 |
| 3,528,246 | 9/1970 | Fischer | 416/193 R |
| 3,549,272 | 12/1970 | Bauger et al. | 416/193 R |
| 3,936,230 | 2/1976 | Helmintoller, Jr. et al. | 416/193 R |
| 4,363,602 | 12/1982 | Martin | |
| 5,261,227 | 11/1993 | Giffin, III | |

Primary Examiner—James Larson
Attorney, Agent, or Firm—Andrew C. Hess; Wayne O. Traynham

[57] ABSTRACT

A blisk includes a disk and a plurality of inner airfoils extending radially outwardly therefrom, with each of the inner airfoils having an integral shroud support at a radially outer end thereof. A plurality of outer airfoils extend radially outwardly from respective ones of the shroud supports, and a plurality of discrete shroud segments are disposed respectively between adjacent ones of the shroud supports to collectively form an annular shroud for radially separating flow between the inner and outer airfoils. Each of the shroud segments is removably joined to only one of the adjacent shroud supports to improve manufacturing access, to allow replacability, and to allow differential movement and friction damping during operation.

10 Claims, 1 Drawing Sheet

SHROUDED FAN BLISK

BACKGROUND OF THE INVENTION

A gas turbine engine fan or compressor is typically formed with one or more stages including a disk from which extends radially outwardly a plurality of circumferentially spaced apart rotor blades. Each rotor blade includes an airfoil and a dovetail at its root, with the dovetail being radially retained in a complementary slot in the perimeter of the disk. During operation, the disk and blades attached thereto rotate, with the blades developing substantial centrifugal force which is carried downwardly through the respective dovetails and into the disk. The dovetails must be suitably configured and sized for supporting the blades with a suitably low level of stress for obtaining a useful life in operation.

In some gas turbine engine designs, the conventionally known radius ratio and blade solidity are such that the blades are disposed relatively close together around the perimeter of the disk, with the disk being relatively small in diameter compared to the airfoils which results in the inability of conventional dovetail designs to carry centrifugal loading at suitable levels of stress for enjoying a useful service life. Accordingly, the airfoils are manufactured integrally with the disk in a one piece component conventionally known as a blisk. A blisk is typically manufactured from a one piece solid forging which is conventionally machined using either a mill or electrochemical machining (ECM) electrodes. With the blades being integral with the disk, satisfactory levels of stress may be obtained in the blisk during operation for obtaining a useful life.

In yet another application of a blisk, a continuous midspan or part-span shroud is provided to bifurcate the airfoils into inner, or hub, airfoils and outer, or tip, airfoils so that airflow may be channeled separately thereover in different inner and outer flowpaths for use in a variable cycle gas turbine engine for example. The 360° continuous shroud not only seals or prevents radial crossflow or leakage between the inner and outer flowpaths but substantially increases the overall stiffness of the blisk to raise its vibrational frequencies into a more desirable range. The additional mass provided by the shroud itself also generates centrifugal loads during operation which in part are carried through hoop stresses generated in the shroud during operation. Some of the shroud centrifugal loads however are also carried through the inner airfoils to the disk.

The continuous shroud in a blisk poses numerous manufacturing problems since the shroud itself significantly limits access to the region of the inner airfoils and inner diameter of the shroud itself which are formed by removal of material from the original solid forging. Furthermore, normal wear or damage to the shroud during operation of the engine will require a more complex process in order to remove any damaged portion of the shroud and suitably replace it. The damaged portion must be cut from the shroud, with a replacement portion being welded thereto.

SUMMARY OF THE INVENTION

A blisk includes a disk and a plurality of inner airfoils extending radially outwardly therefrom, with each of the inner airfoils having an integral shroud support at a radially outer end thereof. A plurality of outer airfoils extend radially outwardly from respective ones of the shroud supports, and a plurality of discrete shroud segments are disposed respectively between adjacent ones of the shroud supports to collectively form an annular shroud for radially separating flow between the inner and outer airfoils. Each of the shroud segments is removably joined to only one of the adjacent shroud supports to improve manufacturing access, to allow replacability, and to allow differential movement and friction damping during operation.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
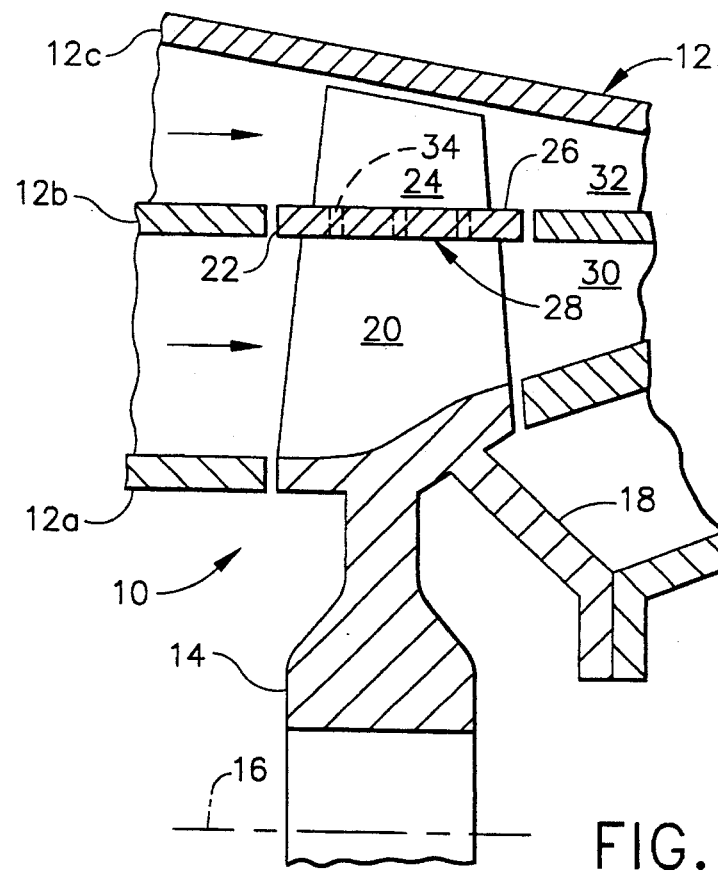
FIG. 1 is an elevational sectional view through an exemplary gas turbine engine blisk having a plurality of discrete shroud segments disposed between inner and outer airfoils in separate inner and outer flowpaths.

Illustrated in FIG. 1 is an exemplary shrouded blisk 10 shown in one stage of a compressor or fan assembly 12 of a gas turbine engine. The blisk 10 includes a conventional disk 14 having an axial centerline axis 16, and includes a suitable annular flange 18 which mounts the disk 14 in the engine for being powered and rotated by a conventional turbine (not shown).

Figure 2:
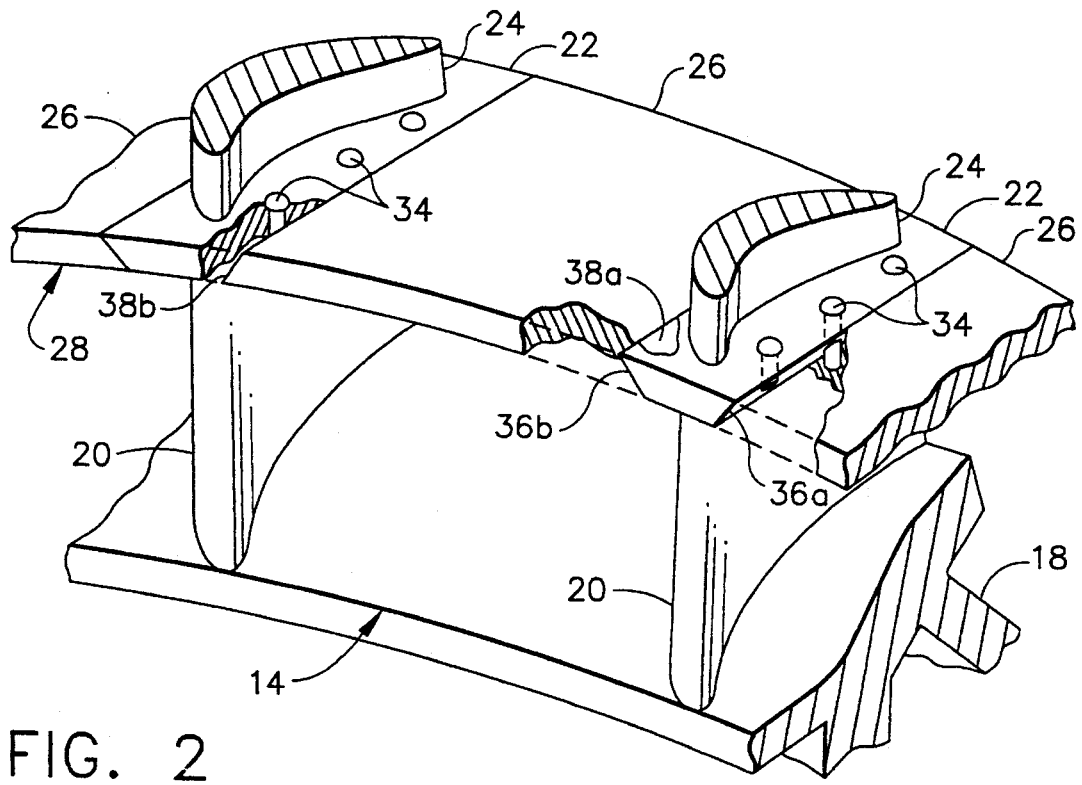
FIG. 2 is an isometric view of a portion of the blisk illustrated in FIG. 1 showing circumferentially adjacent airfoils extending from the disk with one of the shroud segments disposed between adjacent shroud supports.

Referring also to FIG. 2, the blisk 10 also includes a plurality of circumferentially spaced apart radially inner or hub airfoils 20 extending integrally radially outwardly from the disk 14. The inner airfoils 20 are conventionally configured with leading and trailing edges, and concave pressure sides and convex suction sides which extend from their roots at the disk 14 to their radially outer ends or tips. Each of the inner airfoils 20 includes an integral two-sided shroud support 22 at its radially outer end. A plurality of circumferentially spaced apart radially outer or tip airfoils 24 extend integrally radially outwardly from respective ones of the shroud supports 22 of the inner airfoils 20. Each of the outer airfoils 24 is also conventionally configured with leading and trailing edges, and a concave pressure side and convex suction side extending radially from its root at the top of the shroud support 22 to its radially outer end or tip.

The disk 14, inner airfoils 20, shroud supports 22, and outer airfoils 24 collectively form an integral or one-piece assembly which may be manufactured from a common, single solid forging of metal using conventional machining equipment such as a milling machine or electrochemical machine (ECM) electrodes.

The blisk 10 further includes in accordance with the present invention a plurality of discrete part-span or midspan shroud segments 26 each disposed circumferentially between and bridging a respective pair of adjacent ones of the shroud supports 22 to collectively form with each other and with the shroud supports 22 an annular segmented shroud 28 for radially separating flow between the inner and outer airfoils 20, 24. In the exemplary embodiment illustrated in FIG. 1, the fan assembly 12 includes an annular inner wall 12a, a concentric intermediate wall 12b, and a concentric outer casing 12c which are radially spaced apart from each other to define respective annular inner and outer flowpaths 30 and 32. The blisk 10 is disposed in the fan assembly 12 so that the shroud 28 is radially aligned with the intermediate wall 12b, with the inner airfoils 20 being disposed in the inner flowpath 30, and the outer airfoils 24 being disposed in the outer flowpath 32. The shroud 28 therefore forms a portion of the intermediate wall 12b to maintain the separation between the inner and outer flowpaths 30, 32 during operation.

Referring to FIG. 2, the blisk 10 further includes means in the exemplary form of fasteners 34 such as conventional rivets for removably joining each of the shroud segments 26 to only one of the adjacent shroud supports 22 for allowing the individual shroud segments 26 to be separately manufactured from the remainder of the blisk 10, as well as allowing easy repair by replacing individual segments 26. And during operation, the fasteners 34 retain the segments 26 to the respective airfoils when not rotating, and when rotating allow circumferential differential movement between adjacent airfoils at the shroud support 22 for providing friction damping.

In the preferred embodiment illustrated in FIG. 2, each of the shroud segments 26 is disposed in part radially below the adjacent shroud supports 22 for engaging the shroud supports 22 from radially below so that centrifugal force generated during operation upon rotation of the disk 14 urges the shroud segments 26 radially outwardly against the shroud supports 22. Thus, the centrifugal load generated by the shroud segments 26 is carried by the shroud supports 22 and in turn by the inner airfoils 20 and the disk 14. Each of the shroud supports 22 includes tangentially inclined first and second outer pressure faces 36a and 36b disposed on circumferentially opposite sides thereof corresponding with the pressure and suction sides of the inner airfoils 20, respectively. Each of the shroud segments 26 includes first and second inner pressure faces 38a and 38b on circumferentially opposite sides thereof which are tangentially inclined to complement the first and second outer pressure faces 36a, and 36b for providing lap joints in radial abutting contact therewith.

The outer and inner pressure faces 36a, 36b, 38a, and 38b are preferably flat and abut each other during operation to effect abutting seals therebetween for sealing flow leakage between the inner and outer airfoils 20, 24 during operation. As shown in FIG. 2, the outer pressure faces 36a and 36b are inclined to face radially inwardly, and the inner pressure faces 38a and 38b are inclined to face radially outwardly for providing effective yet simple lap joints thereat. For each of the shroud segments 26, its first or suction-side inner pressure face 38a adjoins the second or suction-side outer pressure face 36b of one shroud support 22. And, the second or pressure-side inner pressure face 38b of the same shroud segment 26 adjoins the first or pressure-side outer pressure face 36a of the corresponding adjacent shroud support 22. Corresponding first and second outer pressure faces 36a and 36b of adjacent shroud supports 22 are inclined to converge radially outwardly together as illustrated in FIG. 2. Correspondingly, the first and second inner pressure faces 38a and 38b of each shroud segment 26 are similarly inclined to converge radially outwardly. In this way, adjacent shroud supports 22 radially trap or retain a corresponding shroud segment 26 preventing its release in the radial outward direction. Upon rotation of the disk 14 during operation, centrifugal force generated in each shroud segment 26 engages the inner pressure faces 38a and 38b thereof with the outer pressure faces 36a and 36b of the supporting shroud supports 22.

However, without rotation of the disk 14 the individual shroud segments 26 would fall radially inwardly due to gravity with this lap joint configuration but for the use of the fasteners 34. The fasteners 34 are axially spaced apart from each other as desired and extend radially through each of the shroud supports 22 solely at the first outer pressure face 36a and through a respective shroud segment 26 solely at the corresponding second inner pressure face 38b for supporting the shroud segment 26 as a cantilever. The opposite end of the shroud segment 26 at its first inner pressure face 38a is preferably unsupported in the radially inner direction at the corresponding second outer pressure face 36b of the shroud support 22. In an alternate embodiment, the fasteners 34 could instead be located on the opposite side of the shroud supports.

The fasteners 34 are merely provided to initially retain the individual shroud segments 26 to corresponding ones of the shroud supports 22 until rotation of the disk 14 during operation creates sufficient centrifugal force to urge the shroud segments 26 radially outwardly against the corresponding outer pressure faces 36a and 36b of the shroud supports 22. The fasteners 34 are preferably loosely joined to the shroud supports 22 and shroud segments 26 to reduce or prevent shear loading thereof upon seating of the shroud segments 26 against the shroud supports 22 by centrifugal force during operation. This may be simply accomplished by having the diameter of the fasteners 34 suitably less than the diameters of the corresponding through holes in the shroud supports 22 and the shroud segments 26. In this way, the shroud segments 26 will allow differential vibratory motion between the adjacent shroud supports 22 for providing effective friction damping of the airfoils 20 and 24 during operation. And, differential movement of the adjacent shroud supports 22 will not undesirably impart shear stress through the fasteners 34 for maintaining a suitable useful life thereof and ensuring corresponding retention of the shroud segments 26 during the useful life.

A significant advantage of using the discrete shroud segments 26 in the otherwise one-piece blisk assembly is the improvement of the manufacturing thereof. A suitable solid forging may be more readily conventionally milled or electrochemically machined to form the individual inner and outer airfoils 20 and 24 and the corresponding shroud supports 22 integral therewith. The first and second outer pressure faces 36a and 36b are preferably disposed immediately or closely adjacent to the respective junctures of the inner and outer airfoils 20, 24 from which they extend for maximizing the space between the circumferentially adjacent inner airfoils 20 and shroud supports 22 for allowing substantially unobstructed machining of the inner airfoils 20 and shroud supports 22 without obstruction from the separately attached shroud segments 26. The shroud segments 26 are separately manufactured and then suitably assembled to the shroud supports 22 using the fasteners 34. Correspondingly, upon any damage of an individual shroud segment 26 during operation in the gas turbine engine, it may be readily replaced by simply removing the fasteners 34 and substituting a new shroud segment 26 and new fasteners 34.

In the preferred embodiment, the disk 14, inner and outer airfoils 20, 24, and the shroud supports 22 are formed of the same metal in a common forging having a first density, and the shroud segments 26 preferably have a second density which is less than the first density for reducing centrifugal force of the shroud segments 26 carried by the shroud supports 22 during operation. In a preferred embodiment, the shroud segments 26 comprise a suitable polymeric composite material such as graphite (in fiber, fabric, or mat form) in a polymeric resin matrix conventionally known as PMR 15. The polymeric composite shroud segments 26 provide a useful life in the fan assembly 12 while substantially reducing the centrifugal forces generated thereby. This in turn reduces the attendant stresses in the shroud supports 22 and inner airfoils 20 which carry the centrifugal loads to the disk 14.

In alternate embodiments of the invention, the shroud segments 26 may be otherwise suitably joined to the shroud supports 22 by using a suitable bonding adhesive, such as a polymeric resin, to join the shroud segments 26 at one side thereof to the corresponding shroud supports 22. The joining means may also include a suitable tongue and groove arrangement if desired. In all embodiments, however, it is desirable to provide effective abutting contact sealing between the shroud segments 26 and the shroud supports 22 while also allowing differential movement therebetween for effecting friction damping during operation.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A blisk for a gas turbine engine comprising:
   a disk;
   a plurality of circumferentially spaced apart inner airfoils extending radially outwardly from said disk, each of said inner airfoils having an integral shroud support at a radially outer end thereof;
   a plurality of circumferentially spaced apart outer airfoils extending radially outwardly from respective ones of said shroud supports;
   a plurality of discrete shroud segments each disposed circumferentially between a respective pair of adjacent ones of said shroud supports to collectively form an annular shroud for radially separating flow between said inner and outer airfoils; and
   means for removably joining each of said shroud segments at one side thereof to one of said adjacent shroud supports, with an opposite side thereof being unsupported in a radially inner direction at an opposite one of said adjacent shroud supports.

2. A blisk according to claim 1 wherein each of said shroud segments is disposed in part radially below said adjacent shroud supports so that centrifugal force generated during operation urges said shroud segments radially outwardly against said shroud supports.

3. A blisk according to claim 2 wherein:
   each of said shroud supports includes inclined first and second outer pressure faces disposed on circumferentially opposite sides thereof; and
   each of said shroud segments includes first and second inner pressure faces inclined to complement said first and second outer pressure faces for providing abutting contact therewith.

4. A blisk according to claim 3 wherein said joining means comprise a plurality of fasteners extending radially through each of said shroud supports at said first outer pressure face and through a respective shroud segment at said second inner pressure face for supporting said shroud segment as a cantilever.

5. A blisk according to claim 4 wherein said fasteners are loosely joined to said shroud supports and shroud segments to reduce shear loading thereof upon seating of said shroud segments against said shroud supports by centrifugal force.

6. A blisk according to claim 3 wherein said outer and inner pressure faces are substantially flat.

7. A blisk according to claim 6 wherein said outer and inner pressure faces effect abutting seals therebetween for sealing flow leakage between said inner and outer airfoils during operation.

8. A blisk according to claim 3 wherein said disk, inner and outer airfoils, and shroud supports have a first density, and said shroud segments have a second density less than said first density for reducing centrifugal force of said shroud segments carried by said shroud supports.

9. A blisk according to claim 8 wherein said disk, inner and outer airfoils and shroud supports are metal, and said shroud segments comprise a polymeric composite material.

10. A blisk according to claim 3 wherein said first and second outer pressure faces are disposed adjacent to said inner and outer airfoils from which they extend for maximizing space between circumferentially adjacent inner airfoils for allowing substantially unobstructed machining of said inner airfoils and said shroud supports during manufacture.

* * * * *